United States Patent [19]
Felper

[11] Patent Number: 6,049,177
[45] Date of Patent: Apr. 11, 2000

[54] SINGLE FLUORESCENT LAMP BALLAST FOR SIMULTANEOUS OPERATION OF DIFFERENT LAMPS IN SERIES OR PARALLEL

[75] Inventor: Gerald Felper, Orange, Calif.

[73] Assignee: Fulham Co. Inc., Beverly Hills, Calif.

[21] Appl. No.: 09/262,646

[22] Filed: Mar. 1, 1999

[51] Int. Cl.[7] .................................................. H05B 37/02
[52] U.S. Cl. .......................... 315/219; 315/291; 315/307; 315/224; 315/209 R
[58] Field of Search ................................. 315/219, 209 R, 315/223, 224, 225, 276, 312, 325, 291, 307, 308

[56] References Cited

U.S. PATENT DOCUMENTS

| | | | |
|---|---|---|---|
| 5,363,020 | 11/1994 | Chen et al. | 315/209 R |
| 5,434,478 | 7/1995 | Kovalsky et al. | 315/209 R |
| 5,466,992 | 11/1995 | Nemirow et al. | 315/276 |
| 5,519,289 | 5/1996 | Katyl et al. | 315/224 |
| 5,751,120 | 5/1998 | Zeitler | 315/307 |

*Primary Examiner*—Don Wong
*Assistant Examiner*—Tuyet T. Vo
*Attorney, Agent, or Firm*—Monty Koslover

[57] ABSTRACT

An electronic ballast circuit for operating an unlimited number of fluorescent lamps, which provides a high frequency, high open circuit voltage to start almost any fluorescent lamp and a constant current to the lamps once they are started. A single ballast is designed and rated to operate over a power range, simultaneously supplying a number of lamps. The ballast receives 120 VAC or higher voltage, 50 Hz/60 Hz input power, converts the AC input to a high voltage, high frequency sine wave voltage output to fluorescent lamps connected in series or parallel. One or more selected output capacitors provide current limiting to the lamps, which extends their life by reducing stress. The ballast includes a unique starter circuit that is simple, reliable and low in losses as compared with conventional ballasts.

4 Claims, 5 Drawing Sheets

SINGLE FLUORESCENT LAMP BALLAST FOR SIMULTANEOUS OPERATION OF DIFFERENT LAMPS IN SERIES OR PARALLEL

BACKGROUND OF THE INVENTION

1. Field of the Invention

This invention relates to electrical ballasts used to start and energize fluorescent lamps.

2. Background

Industry has produced a large number of different ballast circuits and controllers for operating fluorescent lamps. A relative few enjoy commercial success and are widely used. This is primarily due to the ballast's cost of manufacture and secondarily, to their suitability to lamp installation needs.

Fluorescent lamps come in different size power ratings and in two groups of linear and compact lamps. Linear lamps are the familiar long lamps commonly used in industrial lighting suspended from the ceiling and in all manner of retail establishments. Compact lamps are of various shapes and may be used for table lamps or other locations demanding a small size lamp. Each type and rating lamp requires a ballast to match it for starting and operation. However, one or more matched ballasts may be used for several lamps connected in series or parallel, providing that the lamps are the same type and rating. As a consequence, lamp producers and retailers have to stock a large variety of ballast ratings and types in order to meet demand.

Presently available ballasts for fluorescent lamps have at least two undesirable operating characteristics. These are the output of a square wave voltage to a lamp, and a possible variation in lamp current, including spikes. The square wave voltage includes harmonics that in time, can severely stress and degrade the performance of the lamp. Variations in lamp current can similarly stress the lamp, leading to early failure. The ballast may also fail. Several ballasts and controllers exist that purport to counter or alleviate these characteristics. However, these devices are expensive to manufacture and generally do not find favor with the consumer because of their cost.

There is therefore a need for a single ballast that may be used to start and operate a range of different rated fluorescent lamps, greatly reducing the number of required ballast ratings in manufacture and storage. There is also a need for a single ballast that can operate different types and ratings of fluorescent lamps in any desired connection configuration. An ongoing need is improving the output characteristics of the ballasts to reduce stress on the lamps without increasing ballast cost.

SUMMARY OF THE INVENTION

The present invention provides an electronic ballast circuit producing a high voltage, high frequency, constant current supply for starting and operating an unlimited number of different fluorescent lamps. The ballast circuit receives 120 VAC or 230/240 or higher VAC, 50 Hz/60 Hz input power, converts the AC input to a high voltage, high frequency sine wave voltage output, providing a high open circuit voltage for starting lamps and a constant current to one or more lamps connected in series or parallel. One or more selected output capacitors provide current limiting to the lamps.

Each ballast is rated for a range of power and is able to start and operate any type of fluorescent lamp. The ballast starting circuit is simple, reliable and dissipates little power as compared with conventional ballasts. Lamp lifetime is protected by the provision of constant lamp current and a sinewave voltage output.

Accordingly, it is a principal object of this invention to provide a very low cost fluorescent lamp ballast that can simultaneously operate any number of lamps in series or parallel from a single ballast.

Another object is to provide a ballast that can simultaneously operate lamps differing in type and power rating.

Yet another object is to provide a ballast having an output that will not stress and degrade connected lamps.

A ballast advantage is its capability of supplying a wide range of lamp power requirements from a single ballast.

Further objects and advantages of the invention will be apparent from studying the following portion of the specification, the claims and the attached drawings.

DESCRIPTION OF THE PREFERRED EMBODIMENTS

Figure 1:
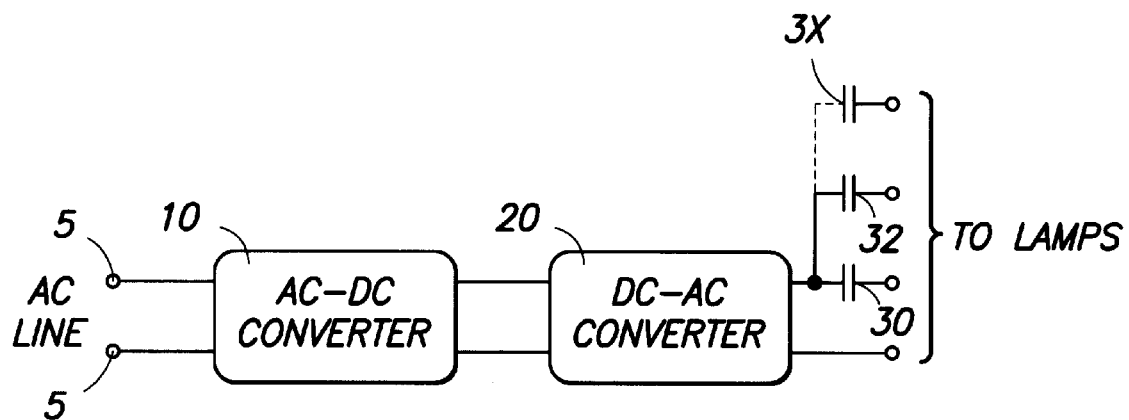
FIG. 1 is a block diagram of a ballast circuit according to the present invention.

Referring particularly to the drawings, there is shown in FIG. 1 a block diagram of an electronic ballast circuit according to the present invention. 50 or 60 Hz, 120 or 230/240 VAC or higher line power is input at the ballast input terminals 5 and is rectified by an AC-DC converter circuit 10. The rectified power which is about 165 VDC or about 300 VDC depending on the input voltage, is passed to a DC-AC converter circuit 20 which produces a high frequency (90 kHz) sine wave AC output. This DC-AC converter output is connected to one or more capacitors 30, 32, 3X, which provide constant current and current limiting to one or more lamps connected in series or parallel.

Figure 2:
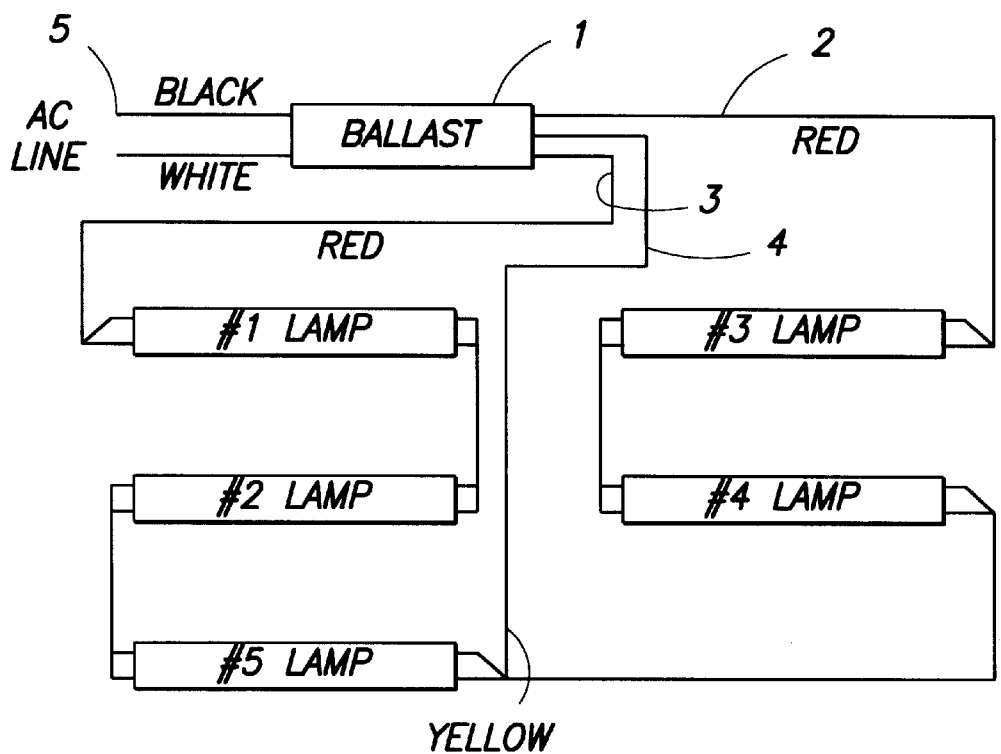
FIG. 2 is a typical wiring configuration for one ballast supplying five lamps connected in series and parallel.

Refer now to FIG. 2. This illustrates a typical wiring diagram for a single ballast 1 that supplies five lamps in paralleled groups of two and three lamps. The lamps in this illustration are all four-pin linear types and are connected between output lines 2 (red) and 4 (yellow) or between output lines 3 (red) and 4 (yellow). If there were to be three paralleled groups connected instead of the two shown, the ballast would have a third red output line for the third group connection. The lamps in either group may differ in power rating, and their number may also be increased. The only limitation is that the total power demanded by the lamps must not exceed the power rating of the ballast 1, and the demand start voltage must not exceed the ballast open circuit voltage.

There are two preferred circuit embodiments of the invention ballast 1. The first is for an AC power line voltage of 120 VAC and the second is for an AC power line voltage of 230/240 VAC or higher. Both circuit embodiments perform the same functions in the AC-DC converter and the DC-AC converter. However, the topology of the second embodiment differs from the first in order to accept the higher input power line voltages without having to use higher voltage and higher cost switching components.

Figure 3:
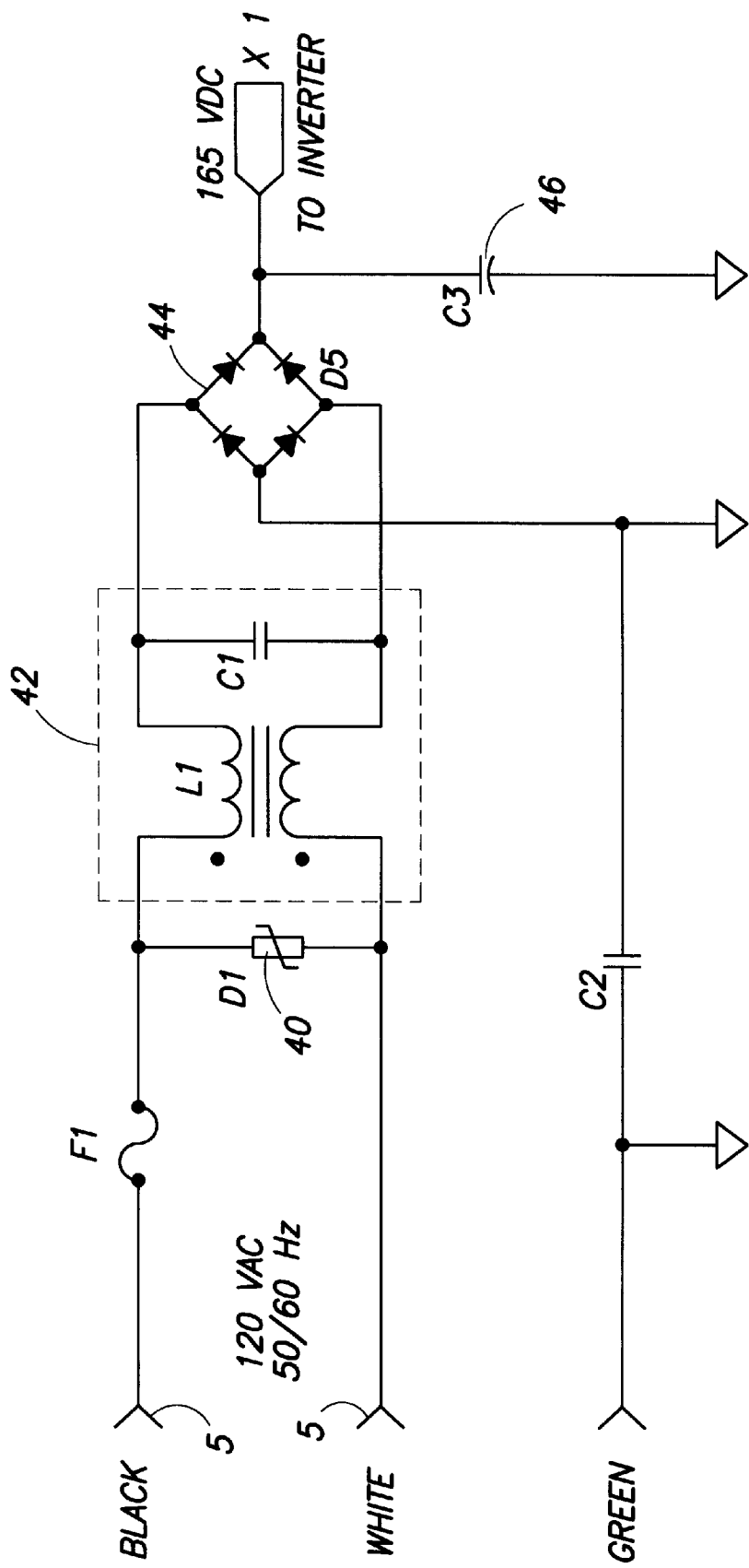
FIG. 3 is a simplified schematic of the AC-DC converter circuit forming part of the ballast circuit in FIG. 1 for a ballast voltage input of 120 VAC.

The first preferred circuit embodiment is now described. Refer to FIG. 3 which is a simplified schematic diagram of the AC-DC converter 10 of FIG. 1 for a power line input of 120 VAC 50/60 Hz. The AC-DC circuit uses an MOV (metal-oxide varistor) D1, 40 for surge protection, an EMI filter circuit 42, a full-wave bridge rectifier D5, 44, an output 10 filter capacitor C3, 46 and a line capacitor C2 to convert the line input voltage of 120 VAC to a DC voltage of about 165 VDC.

120 VAC 50/60 Hz input power is connected to the input terminals 5, fused by fuse F1 and through a surge protection means D1, 40, thence through an EMI filter means 42 comprising a choke L1 and capacitor C1, then to a full-wave bridge rectifier D5, 44. Capacitor C2 is inserted in the bridge ground line to provide protection from any disturbance that may be transmitted through a ground line. The bridge rectifier 44 outputs a ripple DC voltage which is filtered and smoothed by capacitor C3, 46 connected to the bridge rectifier output, producing about 165 VDC at the X1 connector for inversion by the DC-AC converter.

The rectifier output filter configuration shown in FIG. 3, which is simply a capacitor (C3) connected to ground, is for applications where a medium to low input power factor is acceptable. Where a high power factor is required, capacitor C3 would be replaced by a pedestal filter circuit in an "H" configuration comprising two parallel strings of a capacitor in series with a diode, and a third diode connected between the strings at their center point. This filter circuit ensures a high input power factor as well as low line current harmonic distortion.

Figure 4:
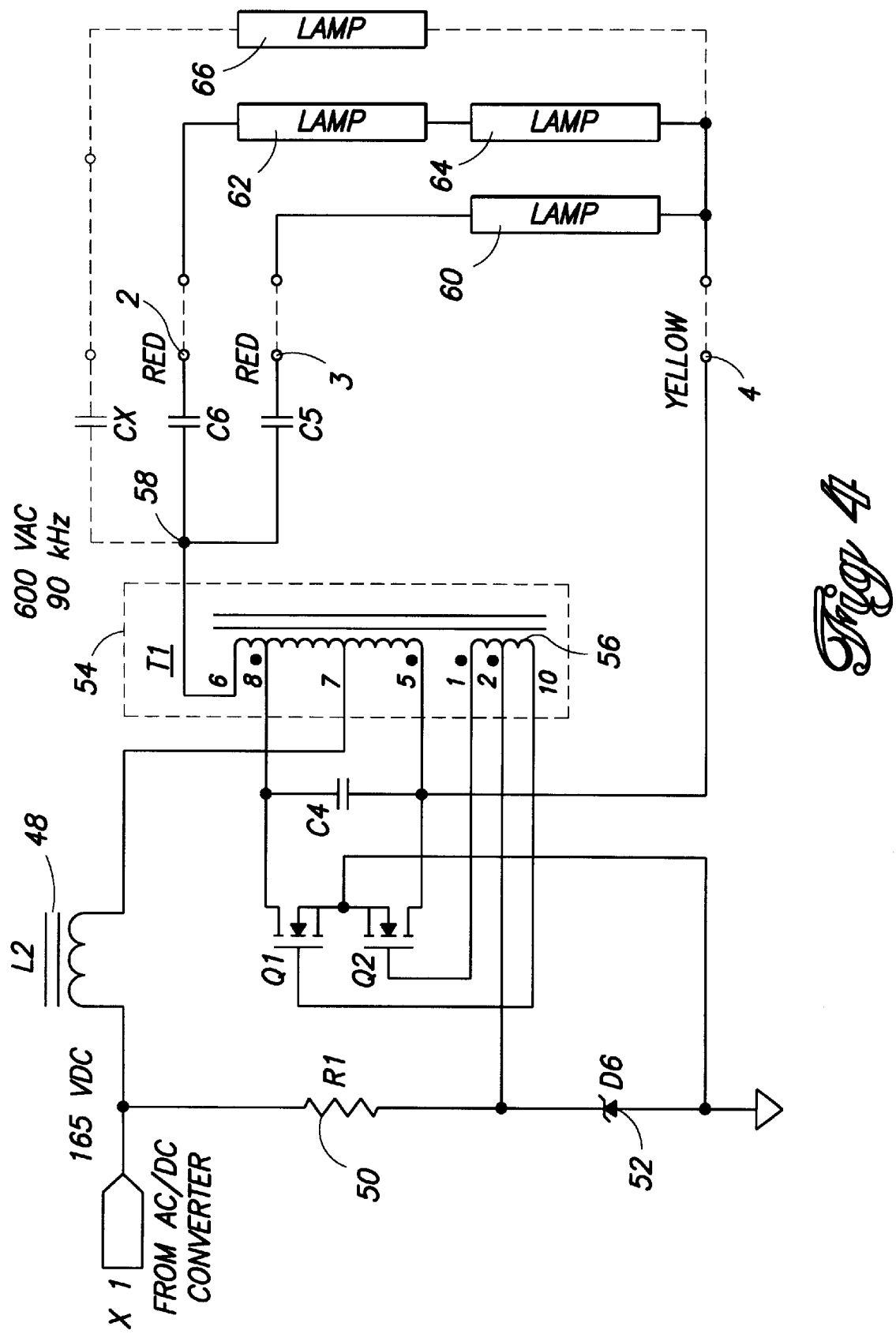
FIG. 4 is a simplified schematic of the DC-AC converter circuit and output capacitors forming parts of the ballast circuit in FIG. 1 for a ballast voltage input of 120 VAC, and including an example configuration of output connected lamps.

Refer now to FIG. 4 which is a simplified schematic diagram of the DC-AC converter 20 of FIG. 1 for a 120 VAC power line input. The converter uses a resonant push-pull topology to drive an autotransformer and employs a unique self-starting circuit as follows: A resonant choke L2, 48 and capacitor C4 are used together with the primary inductance of the transformer T1, 54 to set the resonant frequency of the converter. As DC power is applied, a low power zener diode D6, 52 which is connected to a dropping resistor R1, 50, provides a voltage to the center tap of the gate drive windings 56 of the transformer T1 sufficient to turn on one of the MOSFET's Q1, Q2. As the oscillation starts, the zener starting voltage is countered by the drive voltage generated by the transformer windings, causing both MOSFET's Q1, Q2 to switch in turn, driving the transformer T1, 54.

Capacitors C5, C6 through Cx are connected to the output 58 with a capacitor per line, and together with transformer inductance, act to change the auto-transformed output voltage waveform to a sine wave having an open circuit voltage of about 600 VAC at a frequency of approximately 90 kHz.

In FIG. 4 two lines with capacitors are shown connected to the transformer output 58, with a third shown dashed (ghosted) only to represent one or more additional lines. Capacitor C5 is shown ready for connection to a lamp 60 through an output red terminal 3. Capacitor C6 similarly is shown ready for connection to lamps at a red terminal 2. However, this line has two series connected lamps 62, 64, while capacitor CX serves only one lamp 66. All the lamp lines are connected to a common tie for connection to the ballast yellow output terminal 4, and may include any number of lamps per line.

It should be noted that the lamps in each line may also have differing power ratings and types. However, the output of the ballast will adjust to the lamps' requirements by controlling the current in each line. To do this, all the output capacitors, C5, C6 through Cx, provide ballasting current limiting as well as a constant current to the lamps. Capacitors are selected for this function because, since the current is out of phase with the voltage, it would not dissipate any power other than its resistive component, which is small for the selected capacitors, particularly at a high frequency of 90 kHz. The capacitors C5, C6 through Cx also reflect back to the primary of the transformer T1, 54 to set the output frequency.

Figure 5:
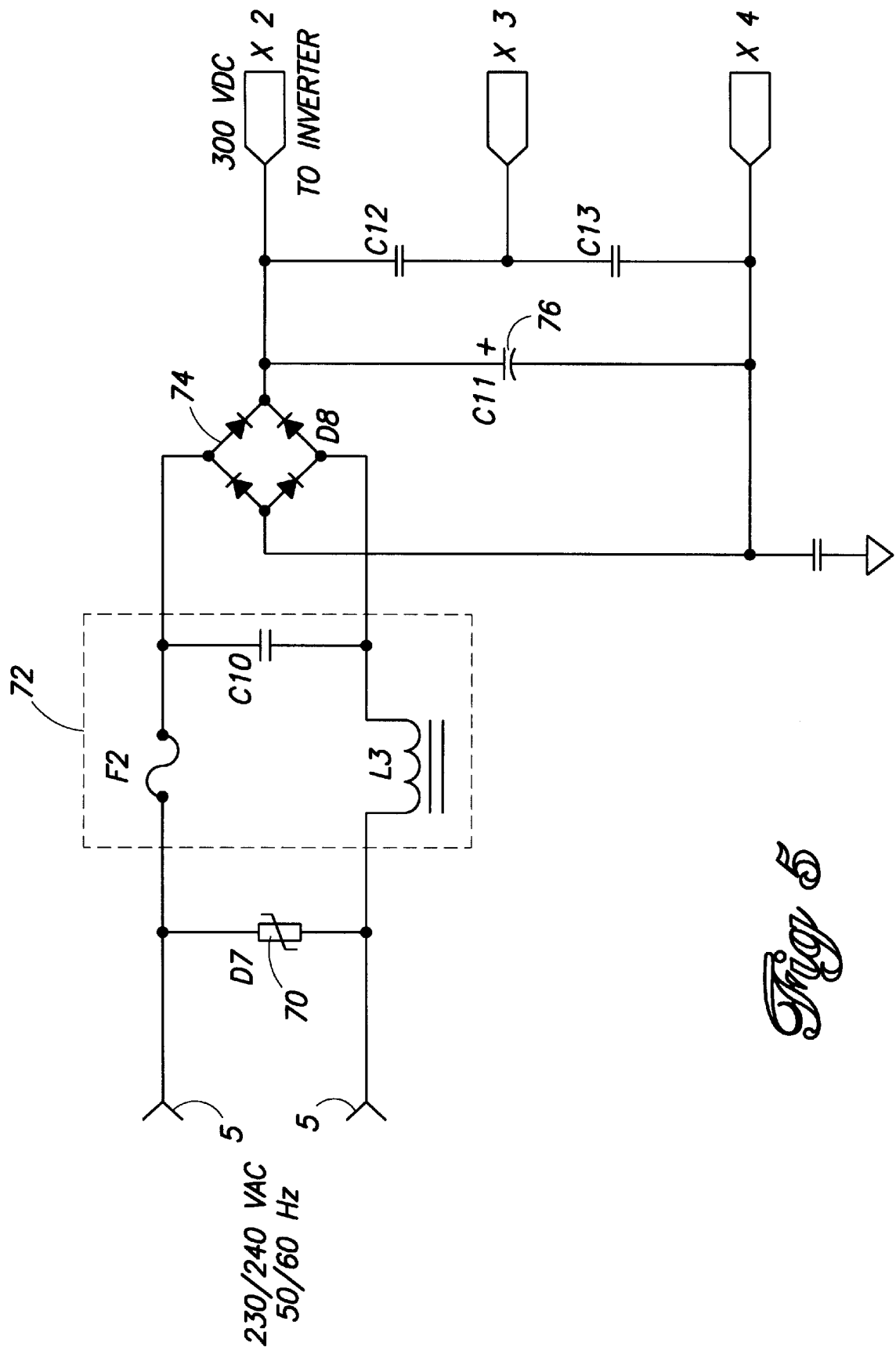
FIG. 5 is a simplified schematic of the AC-DC converter circuit forming part of the ballast circuit in FIG. 1 for a ballast voltage input of 230/240 VAC or higher.
Figure 6:
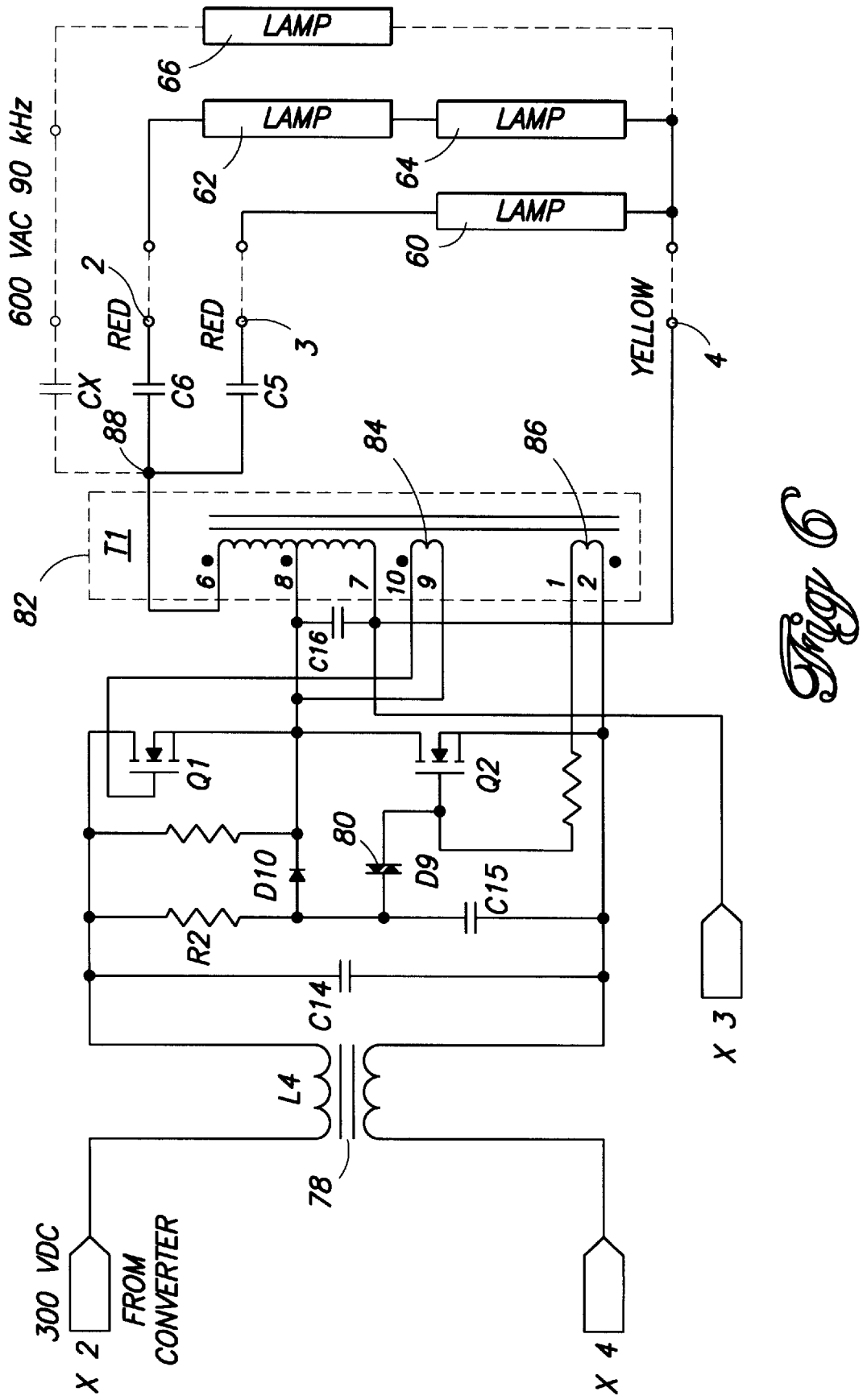
FIG. 6 is a simplified schematic of the DC-AC converter circuit and output capacitors forming parts of the ballast circuit in FIG. 1 for a ballast voltage input of 230/240 VAC or higher, and including an example configuration of output connected lamps.

The second preferred circuit embodiment is described in FIGS. 5 and 6 and is now discussed. Refer now to FIG. 5 which is a simplified schematic diagram of the AC-DC converter 10 of FIG. 1 for a line input voltage of 230/240 VAC or more, 50/60 Hz. This AC-DC circuit is similar to that described earlier for the first preferred embodiment and performs the same functions. The circuit uses an MOV D7, 70 for surge protection, an EMI filter circuit 72, a full-wave bridge rectifier D8, 74, and an output filter capacitor circuit to covert the line input voltage of 230/240 VAC to a DC voltage of about 300 VDC.

230/240 or higher VAC, 60 Hz line power is connected to the input terminals 5, through a surge protection means D7, 70, through a fuse F2 and thence through an EMI filter means 72 comprising a choke L3 and capacitor C10, then to a full-wave bridge rectifier D8, 74. A capacitor is inserted in the bridge ground line to provide protection from any disturbance that may be transmitted through a ground line. The bridge rectifier 74 outputs a ripple DC voltage of about 300 VDC which is filtered and smoothed by a filter circuit comprising capacitors C11 76, C12 and C13.

This output filter, with minor additions, may also be configured in a manner that will act to produce a high input power factor for the AC-DC rectifier.

Refer to FIG. 6 which is a simplified schematic diagram of the DC-AC converter 20 of FIG. 1 for a ballast line input of 230/240 VAC, 50/60 Hz. Because of the higher line voltage, the converter employs a conventional half bridge circuit to drive an auto-transformer T1 instead of the push pull topology described earlier. A push pull topology if used, would require having higher voltage MOSFETs at a higher cost, for driving the transformer. The push pull topology was therefore replaced by a half bridge.

A resonant choke L4, 78, capacitor C14 and capacitor C16 are used together with the primary inductance of the transformer T1, 82 to set the resonant frequency of the converter. As high VDC power is applied, capacitor C15 charges through resistor R2 and discharges through a Diac D9, 80 (symmetrical diode) continuing to produce starting pulses connected to the gate of MOSFET Q2. This energizes the transformer T1, 82 and transformer gate drive windings 84 and 86 which start to apply drive signals to MOSFETs Q1 and Q2. As oscillation starts, a diode D10 which is connected to the transformer center tap is caused to clamp the Diac D9, and the starting pulses generated by capacitor C15 are stopped.

The MOSFETs Q1, Q2 drive the transformer T1, 82 which auto-transforms and produces an ac voltage waveform that is applied to the output capacitors, C5, C6 through CX. The action of the transformer inductance and current through the output capacitors produces a sinewave waveform output of about 600 VAC open circuit at a frequency of approximately 90 kHz at the ballast output terminals 2, 3, 4, for application to attached lamps. The transformer connected 88 output capacitors C5, C6 through CX reflect back to the primary of transformer T1, 82 to set the frequency, and also provide the functions of current limiting and constant current supply to connected lamps, 60, 62, 64 and 66.

In reviewing both of the above preferred ballast circuit embodiments, particular note should be made of the described circuit means for starting the DC-AC converter, the means for setting the DC-AC converter output frequency, and the means used for current limiting and providing constant current to any connected lamps. In each case, the circuits employ only standard, available components totalling few in number.

The means for starting the DC-AC converter is uniquely simple, utilizing in one embodiment a resistor, a zener diode and a transformer winding to produce and deliver the starting signals to MOSFETs, and in the other embodiment, a resistor, a capacitor, a Diac (double symmetrical diode) and a transformer winding to produce and deliver starting signals. No control circuitry is required to initiate or control the start up. Due to the configuration of the start up circuit and its component properties, power dissipation on start up is very low.

The circuit means for setting the output frequency does not require the use of auxiliary oscillator circuits using IC's and crystals as is the customary practice for many DC-AC converters. Rather, the built-in power components of a choke, capacitors and the transformer primary winding are used in a resonant mode to set the frequency. This approach reduces the number of required ballast components as well as ensuring a more stable, reliable voltage frequency output.

The circuit means for providing current limiting utilizes only selected capacitors, at one capacitor per line of lamps. These capacitors provide not only the ballasting requirement of current limiting, but also provide constant current to the lamps, all with little power dissipation because the sine wave current through the capacitors is 90 deg. out of phase with the output voltage. The capacitors also act as an output filter for the auto-transformer, helping to produce a sine wave output voltage waveform.

While fluorescent lamp ballasting technique is well known to the ballast industry, the invention does have a number of unique capabilities stemming from its design. The most important of these capabilities are:

1. Since the lamp current is set by the output capacitors, any number of lamps may be operated in series from one capacitor or in parallel by adding capacitors.
2. Different types and power fluorescent lamps may be operated at the same time from one ballast because many different lamps operate at the same current. Also, more than one lamp can be operated in series since the current provided will be the same for each lamp, and the ballast open circuit voltage is high enough to start a number of CFL's (compact fluorescent lamps) and linear (straight tube) lamps in series.
3. The oscillating starting circuit used in the DC-AC converter dissipates very little power.

Only a few different rated ballasts are needed to cover the ballast needs of most present day fluorescent lamp lighting installations. The invention ballast may therefore be produced with relatively few ballasts covering a wide range of power ratings. This fact together with the ballast applicability to all types of fluorescent lamps, greatly reduces the number of different ballasts that need to be manufactured and stored.

In both the foregoing ballast circuit embodiments, the circuits are designed to provide a high reliability ballast which is also low cost. To achieve this, the AC-DC converter and DC-AC converter circuits use only well known standard components that are operated at low stress levels. These circuits are configured using the least number of components to provide ballasting for an unlimited number of different lamps. Each ballast provides a high frequency, high open circuit sine wave voltage capable of starting almost any fluorescent lamp and a constant current to the lamp once it has started. The lamps are external to the ballast circuit and do not affect ballast output characteristics. Also, since only constant current can be supplied to any lamp, a lamp end of life protection is provided.

From the foregoing description, it is believed that the first and second preferred embodiments of the ballast circuits achieves the objects of the present invention. Various modifications and changes may be made in the circuits described above which are apparent to those skilled in the art. These alternatives and modifications are considered to be within the scope of the appended claims and are embraced thereby.

Having described the invention, what is claimed is:

1. A ballast circuit for energizing one or more fluorescent lamps connected in series or parallel, said ballast circuit being powered from a line voltage of 120 VAC, 50/60 Hz; said ballast circuit in combination comprising:

(a) an input power connector;
   (b) a protection fuse which is connected to said input power connector;
   (c) an AC-DC converter circuit which is connected to said input power connector and to said fuse, said AC-DC converter circuit comprising: means for circuit surge protection from high transient input voltage signals, an electromagnetic interference (EMI) filter circuit means which is connected to said means for circuit surge protection, a full-wave bridge rectifier circuit which is connected to said EMI filter circuit means, said rectifier circuit having a ripple waveform DC output, and DC output filter means for smoothing said ripple waveform DC output;

said AC-DC converter circuit producing an approximately 165 VDC output voltage at its DC output terminals, commensurate with a 120 VAC input voltage applied to said input power connector;

(d) a DC-AC converter circuit which is connected to said DC output terminals to accept a DC line output, said DC-AC converter comprising: a push-pull switching circuit comprising an auto-transformer and a pair of transistors that are connected in push-pull configuration to the primary of said auto-transformer; a frequency-set circuit which sets the resonant frequency of said push-pull transformer circuit, said frequency set circuit comprising a resonant inductor having its input connected to said DC output terminals, and its output connected to the center tap of the primary inductance of said auto-transformer, and a resonant capacitor which is connected in parallel with said primary inductance, said frequency set circuit producing an output frequency of about 90 kHz;

two gate-drive windings, said gate-drive windings being energized by said autotransformer, each said winding having an output connection to the gate of one of said transistors for applying drive signals; and an oscillation starting circuit, said starting circuit comprising a zener diode that is supplied from the DC line through a resistor, said zener diode having an output voltage connected to the center tap point of said gate-drive windings, and thence through said windings to the gates of said transistors, providing a starting voltage high enough to turn on a transistor, said starting voltage being counteracted by the drive voltage generated by said auto-transformer through said gate-drive windings once oscillation has started due to transistor switching;

(e) an output circuit comprising a multiplicity of capacitors, said capacitors being connected in parallel to the output of said auto-transformer and reflecting back to the primary of said auto-transformer and modifying the output frequency, said capacitors providing current limiting for any loads connected to their output terminals; and (f) ballast output terminals connected to said capacitors in said output circuit, said output terminals being marked for connection to fluorescent lamps;

each of said capacitors in said output circuit reacting with said autotransformer output voltage to produce a sine wave voltage and current waveform at about 600 VAC, and about 90 kHz open circuit, and producing a constant current for supplying any number of connected fluorescent lamps.

2. A ballast circuit as defined in claim 1, wherein said EMI filter circuit means includes a filter circuit comprising an inductor in series connection and a bypass capacitor connected in parallel across the input voltage lines, said filter circuit preventing switching noise signals that may be generated by the ballast circuit from conducting and reflecting back into the AC power source line.

3. A ballast circuit for energizing one or more fluorescent lamps connected in series or parallel, said ballast circuit being powered from a line voltage of 230/240 or higher VAC, 50/60 Hz; said ballast circuit in combination comprising:

(a) an input power connector;

(b) a protection fuse which is connected to said input power connector;

(c) an AC-DC converter circuit which is connected to said input power connector and to said fuse, said AC-DC converter circuit comprising: means for circuit surge protection from high transient input voltage signals, an electromagnetic interference (EMI) filter circuit means which is connected to said means for circuit surge protection, a full-wave bridge rectifier circuit which is connected to said EMI filter circuit means, said rectifier circuit having a ripple waveform DC output, and DC output filter means for smoothing said ripple waveform DC output;

said AC-DC converter circuit producing about 300 VDC output voltage at its DC output terminals, commensurate with a 230/240 VAC input voltage applied to said input power connector;

(d) a DC-AC converter circuit which is connected to said DC output terminals to receive a DC line voltage, said DC-AC converter comprising: a half-bridge switching circuit comprising an auto-transformer and a pair of transistors that are connected in a half-bridge configuration to the primary of said auto-transformer; a frequency-set circuit which sets the resonant frequency of said half-bridge switching circuit, said frequency set circuit comprising a resonant inductor having its input connected to said DC output terminals, and a paralleled resonant first capacitor, both being connected through a resistance to the center tap of the primary inductance of said auto-transformer, and a resonant second capacitor connected to said primary inductance, said frequency set circuit producing an output frequency of about 90 kHz;

two gate-drive windings, said gate-drive windings being energized by said auto-transformer, each said winding having an output connection to the gate of one of said transistors for applying drive signals; and an oscillation starting circuit, said starting circuit comprising a third capacitor that is supplied from the DC line through a resistor, said third capacitor discharging its output voltage through a symmetrical double diode (Diac) and thence through to the gate of one of said transistors, providing a starting voltage high enough to turn on a transistor, said gate-drive windings providing drive voltage to both said transistors once oscillation has started and said capacitor output is clamped thereby;

(e) an output circuit comprising a multiplicity of capacitors, said capacitors being connected in parallel to the output of said auto-transformer and reflecting back to the primary of said auto-transformer and modifying the output frequency, said capacitors providing current limiting for any loads connected to their output terminals; and (f) ballast output terminals connected to said capacitors in said output circuit, said output terminals being marked for connection to fluorescent lamps;

each of said capacitors in said output circuit reacting with said autotransformer output voltage to produce a sine wave voltage and current waveform at about 600 VAC, at approximately 90 kHz open circuit, and producing a constant current for supplying any number of connected fluorescent lamps.

4. A ballast circuit as defined in claim 3, wherein said EMI filter circuit means includes a filter circuit comprising an inductor in series connection and a bypass capacitor connected in parallel across the input voltage lines, said filter circuit preventing switching noise signals that may be generated by the ballast circuit from conducting and reflecting back into the AC power source line.

* * * * *